Dec. 2, 1969 R. A. FEWEL 3,481,349
VAPORIZATION CONTROL
Filed Aug. 17, 1967
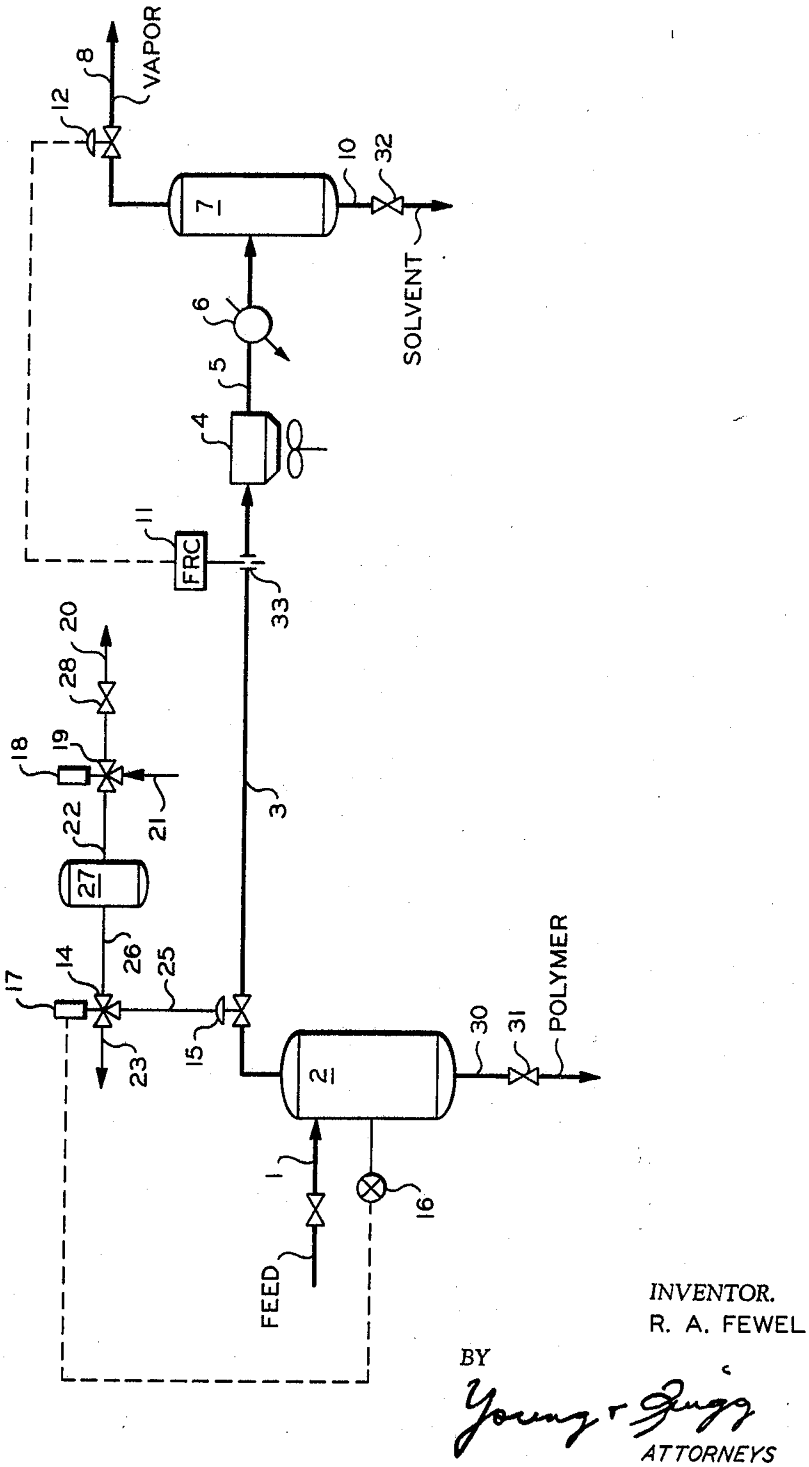
INVENTOR.
R. A. FEWEL
BY
Young & Quigg
ATTORNEYS United States Patent Office 3,481,349
Patented Dec. 2, 1969

3,481,349

VAPORIZATION CONTROL

Robert A. Fewel, Bartlesville, Okla., assignor to Phillips Petroleum Company, a corporation of Delaware Filed Aug. 17, 1967, Ser. No. 661,444
Int. Cl. B01d 3/42, 3/06
U.S. Cl. 137—2 5 Claims

ABSTRACT OF THE DISCLOSURE

The rate of vapor removal from a vessel containing vapor under pressure and in solution is controlled by a pressure-to-close valve in the vapor exit line by gradually reducing the pressure on said control valve and is further governed by a second flow control valve downstream of said pressure-to-close valve inversely in response to the pressure drop through an orifice intermediate the two valves.

BACKGROUND

The recovery of hydrocarbons from mixtures thereof comprising relatively volatile hydrocarbons or mixtures of volatile hydrocarbons and relatively non-volatile material can, of course, be readily accomplished in degree by either heating the mixtures or reducing the pressure thereon. However, where this vaporization is relatively rapid the composition of the vapor phase removed exhibits substantial departure from the equilibrium compositions that would be expected. Particularly in batch operations where vaporization is accomplished by rapidly reducing the system pressure, the less volatile constituents tend to flash when the pressure reduction is substantial with the consequence that the degree of removal of more volatile components is substantially reduced. In addition, in systems where it is desirable due to consideration of either necessity, practicality or convenience to avoid the addition of heat to accomplish the desired degree of vaporization, the degree of recovery of volatile hydrocarbon is substantially reduced in the absence of adequate control of the batch operation. Another important consideration in the recovery of the volatile hydrocarbons from mixtures thereof with relatively non-volatile materials is the fact that the composition of the vapor phase removed during such batch operations is variant in that the amount of more highly volatile components in the liquid phase and consequently in the vapor phase is substantially reduced as the vaporization progresses with the result that the vapor phase becomes more highly concentrated in the less volatile constituents. As the control of such systems must necessarily be governed in response to these transient characteristics of the vapor phase, it is necessary to employ in the control of such batch operations a system adequate to accommodate these variations and govern the vaporization from start to finish in a predetermined manner so as to realize the desired recovery.

For example, such systems are of substantial importance in the recovery of diluent and unreacted monomer in batch polymerization operations. Following completion of the batch polymerization of butadiene in systems employing butadiene feed streams containing relatively high concentrations of butenes, it is desirable to increase polymer concentration by removing a substantial amount of the diluent and unreacted monomer without the necessity of supplying additional heat to the system for accomplishing this purpose. At the same time, for purposes of recovering and purifying both monomer and diluent, it is desirable to achieve an optimum recovery of these constituents by taking advantage of the pressure and temperature of the polymerization system at its termination.

SUMMARY OF THE INVENTION

Consequently, it is an object of this invention to achieve an optimum recovery of relatively volatile material from mixtures thereof comprising at least two volatile components. It is another object of this invention to accomplish the batch vaporization of mixtures comprising at least two relatively volatile constituents so that an optimum recovery of volatile material is achieved. It is another object of this invention to provide a method and apparatus for governing the batch vaporization of mixtures comprising more than one volatile component, by controlling the vaporization in a predetermined manner in response to variations in the physical characteristics of the system. It is another object of this invention to provide a process and apparatus for the vaporization and recovery of volatile materials in an optimum manner automatically while preventing the carry-over of solid material.

In accordance with one embodiment of this invention, volatile material is removed from a vessel containing the same by passing said volatile material in vapor form through a pneumatic valve, the opening of which is governed by the pressure on said valve and gradually modifying said pressure at a predetermined rate whereby the size of said valve opening is gradually increased.

The vaporization and recovery system which is the subject of this invention is particularly adaptable to the recovery of diluent and unreacted monomer following the termination of batch polymerization operations. For this reason the method and apparatus of this invention will be described in detail with reference to such a polymerization system involving the polymerization of a low concentration butadiene stream. However, it should be observed that this mode of disclosure and illustration should not limit the application of the concept of this invention to this particular embodiment.

As shown in the drawing, the invention is illustrated in combination with removal of diluent and monomers and recovery of the same from a batch polymerization process which can, as in this particular example, comprise the polymerization of a low concentration butadiene stream in a suitable solvent such as cyclohexane or n-hexane. On completion of the batch polymerization, it is desirable to concentrate the polymer solution to alleviate the necessity of handling a major portion of the diluent and unreacted monomers in the polymer recovery and purification circuit. In addition, it is not only desirable but necessary to prevent the carry-over of solid polymer or polymer cement in the overhead solvent and monomer recovery circuit for the obvious reason of preventing system fouling and plugging. This invention provides a method and apparatus by which these objectives can be accomplished by utilizing the pressure and temperature of the polymerization system with or without additional heating, upon the completion of reaction to effect the control volatilization of a substantial part of both diluent and unreacted monomers.

DETAILED DESCRIPTION

Referring now to the drawing, a monomer-diluent blend comprising 6 to 10 parts by weight of cyclohexane and butene solvent and 1 part of styrene and/or butadiene is introduced to batch reactor 2 by way of pipe 1 wherein the styrene and/or butadiene is polymerized in the presence of a lithium based reaction initiator at a temperature of 90°–150° F. and for 15–45 minutes and substantially all reactants have polymerized. Following completion of polymerization and the desired degree of vapor removal hereinafter detailed, the concentrated polymer solution is removed from reactor 2 by way of pipe 30 and valve 31.

Vapor removal rate is controlled both by pressure-to-close valve 15 and flow control valve 12 in a manner hereinafter detailed. Vapors exit the reactor by way of pipe 3 condenser 4, pipe 5, heat exchanger 6, vapor-liquid separator 7 and pipe 8. Liquid condensed in condenser 4 and cooler 6 is allowed to settle in separator 7 and is removed by way of pipe 10 in valve 32.

The pressure on valve 15 can be released through 3-way valve 14 either by way of pipe 23 or pipes 26, 22, valve 19, 28 and pipe 20. Solenoid 17 normally retains the positioning of 3-way valve 14 so that pressure release from valve 15 by way of pipe 25 must be by way of pipe 26. However, it is sometimes necessary, due to the highly exothermic nature of the butadiene polymerization in reactor 2 to rapidly vent the system in the event that reactor temperature exceeds a predetermined limit, e.g., 280° F. When this temperature is exceeded, temperature monitor 16 activates solenoid 17 causing the release of pressure from valve 15 by way of pipes 25 and 23 with the result that pressure on the system is rapidly reduced with the accompanying removal of a substantial amount of the butadiene monomer present in the reactor and a consequent reduction in polymerization rate.

However, under normal operating conditions, valve 15 remains closed until polymerization is terminated at which time solenoid 18 is activated to connect pipes 22 with restriction valve 28 and vent line 20. Prior to the activation of solenoid 18, the 3-way valve 19 is aligned to permit communication between air supply pipe 21 and pipes 22, 26 and 25, thereby maintaining the pressure on valve 15 at a level necessary to maintain the closure thereof.

The gradual opening of valve 15 and therefore the gradual removal of vapor from reactor 2 are accomplished by limiting the rate at which the pressure on valve 15 is reduced. This function is accomplished by restriction valve 28 which is opened to a predetermined setting governed by the rate at which it is desired to open valve 15.

After a period of time sufficient to build up pressure downstream of orifice 33, e.g. 2–3 minutes in this particular embodiment, the control of vapor removal is assumed by valve 12 which governs effluent rate in response to the pressure drop, e.g., 10 p.s.i., across orifice 33 upstream of condenser 4. By this method, a controlled vapor exit rate from the reactor pressure has been substantially reduced.

When the reaction is completed, and it is desired to flash reactor 2, the pressure on valve 15 is gradually decreased and the rate of flow of vapor from the reactor gradually increases. As the flow from the reactor continues, the pressure in the reactor decreases, resulting in reduction of the density of the flashed vapors. As valve 15 continues to open, the pressure drop across orifice 11 increases. During the initial stage of the inventing procedure valve 15 is gradually opened whereby the flow rate of the vapors to overhead line 3 gradually increases. As a result the pressure in process lines and equipment downstream of orifice 33 is caused to increase to a point at which a flow control valve 12 partially closes due to the magnitude of the pressure differential across the orifice. This initial period is required to alternate build up of pressure downstream of the orifice due to the fact that a portion of the overhead vapors is condensed in the heat exchange and condensing apparatus intermediate in the orifice and valve 12. The velocity of flow from the reactor will increase because FRC–11 maintains a given ΔP across orifice 33. With a constant ΔP across the orifice and a decrease in density of the gases flowing through the orifice, there is an increase in the volumetric rate of flow through the orifice. Periodically, FRC–11 can be reset to decrease the controlled ΔP across orifice 33 to prevent the rate of flow of vapors from becoming so great that the polymers are carried out of reactor 2.

This increase in volumetric flow rate at decreasing density can normally be tolerated without danger of carry-over from the reactor. Following completion of the cycle, solenoid 18 is de-energized either manually or automatically by a preset timing mechanism or in response to some process variable, e.g., reactor temperature or pressure, with the result that 3-way valve 19 is aligned to allow the communication of air supply 21 with pipes 22, 26, 25 and valve 15, thereby effecting the closure of valve 15.

Either before or after the solenoid 18 is reset, the concentrated polymer solution or slurry can be removed by way of pipes 30 and valve 31 after which batch reactor 2 can be recharged for further polymerization.

I claim:

1. A process for venting a stream comprising at least two volatile materials from a vessel containing the same which comprises first vaporizing said volatile materials from said vessel and passing, said stream through a pneumatic valve, the opening of which is governed by the pressure on said valve and gradually modifying said pressure at a predetermined rate, whereby the size of said valve opening is gradually increased, and then passing said stream through a flow control valve downstream of said pneumatic valve in response to the flow rate downstream of said pneumatic valve, wherein the opening in said flow control valve is governed inversely in response to the pressure drop through an orifice downstream of said pneumatic valve and upstream of said flow control valve.

2. The process of claim 1 wherein said pneumatic valve is a pressure-to-close valve, the pressure on which is released at a predetermined rate through a vent valve having a constant setting.

3. A process according to claim 1 wherein the rate of flashing gases from a reaction zone, after the reaction has been completed, is controlled to prevent carry-over of non-volatile solid materials which comprises:

- (a) flashing vapors comprising at least two volatile materials overhead from said reaction zone,
- (b) passing said vapors through a pressure-to-close valve, the opening of which is governed by the pressure on said valve and the pressure on said valve is gradually modified at a predetermined rate whereby the size of said valve opening is gradually increased, with the further proviso that in the event the temperature of said reaction exceeds a predetermined limit, the pressure controlling the position of said valve is released responsive to the temperature of the reaction, thereby removing overhead a substantial amount of volatile gases present in the reaction zone,
- (c) passing said vapors through a flow orifice downstream of said valve,
- (d) cooling said vapors to condense a portion of the gases present and passing condensate thus formed and non-condensed vapors to a separator, and
- (e) separating condensate as bottoms from said separator and non-condensed vapor overhead which is passed through a flow control valve, the opening of said flow control being governed inversely in response to the pressure drop through said flow orifice.

4. A process according to claim 3 wherein said reaction is a polymerization reaction and wherein the gases flashed overhead comprise unreacted monomer and diluent and wherein the condensate removed from said separator is diluent and the vapor taken overhead from said separator is unreacted monomer.

5. A process according to claim 4 wherein said polymerization is a batch polymerization and wherein the rate of flashing monomer and diluent overhead from the reaction zone is so controlled as to prevent carry-over of solid polymer.

References Cited

UNITED STATES PATENTS

| | | | |
|---|---|---|---|
| 1,046,236 | 12/1912 | Wagner | 251—35 |
| 2,192,042 | 2/1940 | Hoffmann | 137—501 |
| 2,760,343 | 8/1956 | Reed | 137—14 |

ALAN COHAN, Primary Examiner